Aug. 10, 1965  G. HAUSBERG  3,199,267
GAS SCRUBBER
Filed Jan. 16, 1962  4 Sheets-Sheet 2

Gerhard HAUSBERG
*Inventor.*
BY
*Karl F. Ross*
AGENT

Aug. 10, 1965  G. HAUSBERG  3,199,267
GAS SCRUBBER
Filed Jan. 16, 1962  4 Sheets-Sheet 3

Gerhard HAUSBERG
Inventor.

BY

AGENT

Aug. 10, 1965     G. HAUSBERG     3,199,267
GAS SCRUBBER

Filed Jan. 16, 1962     4 Sheets-Sheet 4

Gerhard HAUSBERG
*Inventor.*

BY

AGENT

United States Patent Office 3,199,267
Patented Aug. 10, 1965

3,199,267
GAS SCRUBBER
Gerhard Hausberg, Essen-Bredeney, Germany, assignor to Gottfried Bischoff, Essen, Germany, a company of Germany
Filed Jan. 16, 1962, Ser. No. 166,511
Claims priority, application Germany, Jan. 19, 1961, B 60,894
5 Claims. (Cl. 55—210)

This application is a continuation-in-part of my copending application Serial No. 96,485, filed March 17, 1961, now Patent No. 3,140,163, issued July 7, 1964.

My invention relates to an installation for cleaning gases and, more particularly, to a wash tower adapted to remove dust and similar impurities from the exhaust gases of industrial plants, metallurgical furnaces or the like and to a method of operating such tower.

In many industries the output of waste gas from a plant, as also the specific dust content of the gas, varies considerably from day to day and from hour to hour. Gas-scrubbing towers therefore must be designed to handle peak loads, hence during a considerable part of their operating time they are working below this peak and at reduced efficiency.

It is an important object of my invention to provide a tower for washing particle-laden gases that has selectively varible capacity and is therefore capable of operating at constant optimum efficiency.

It is a further object of my invention to provide means in such wash tower to enable the maintenance of a selectively variable, relatively high velocity of gas flow therethrough.

It is also an object of this invention to provide an apparatus for more expeditiously scrubbing industrial gases in a column of adjustable flow velocity.

The present improvement is particularly directed to a system wherein, as disclosed in my above-identified copending application, a wash tower with a preferably cylindrical housing is divided into a lower and an upper compartment by a generally horizontal partition. The lower compartment, into which the particle-laden gas is admitted (usually at high temperatures), serves as an expansion chamber with resulting cooling of the gas. The partition is traversed by at least one and advantageously a plurality of parallel constricted passages through which the gas streams at relatively high velocity into the upper compartment while being admixed at this stage with a fine spray of a washing fluid such as water. In the upper compartment, serving as a separating chamber, the moisture-laden gas stream again expands and is subjected to one or more sharp changes of direction whereby the entrained droplets along with the accompanying solids are deflected from the path of the gases which then proceed, purified, toward an exhaust.

The constricted passages are formed, according to an important feature of this invention, by mixing nozzles partly in the shape of Venturi tubes into which a generally drop-shaped throttling insert spacedly projects from below so that its tapering upper part forms an annular, upwardly converging channel of substantially constant cross-sectional area with the similarly tapering lower part of the surrounding shell. Means may be provided, in accordance with a more specific feature of the invention, for varying the relative elevation of the insert and the shell whereby the width of the annular channel therebetween is altered to maintain the desired rate of flow therethrough. The lower end of the insert may be substantially conical with an apex angle corresponding to that of the spray cone of a water jet positioned therebelow. The top of the mixing nozzle, projecting into the upper compartment, is capped by a deflecting hood or baffle and open at its sides for the discharge of the dust-laden droplets in a downward flow and the escape of the scrubbed gases in a mostly upward direction; the partition is advantageously funnel-shaped and provided with a central drain for the collected moisture, the several nozzles being then angularly spaced around the axis of the funnel cone.

A particularly advantageous construction of the upper portion of the mixing nozzle, designed to facilitate the separation of liquid and solid particles from the gas stream with only moderate loss of kinetic energy, involves the provision of a ring of stationary guide vanes around the axis of the shell above the divergent part of the Venturi tube, this ring in turn being surrounded with clearance by a preferably cylindrical sleeve which intercepts the centrifugally outwardly traveling particles as the escaping gas stream is set into a swirling motion by the vanes. I have found that in this case the deflecting cap at the top of the mixing nozzle can be given a more gently curved configuration than otherwise and may even include an obtuse angle between its generatrices and the nozzle axis.

I have found, in accordance with a further feature of this invention, that the optimum gas-flow velocity to be maintained in a system of this character ranges substantially between 60 and 90 meters per second. Under these operating conditions it is possible to process gases with an initial solids content of, say 10 milligrams to 10 grams or more per cubic meter S.T.P. of gas, even with particle sizes in the aerosol range (i.e. below 1 micron or even 0.1 micron), and to reduce their proportion to as little as 3 mg./m.$^3$ S.T.P. In the case of blast-furnace gases this can be accomplished, for example, with a pressure loss of 130 mm. of water and a liquid consumption of 3 liters per cubic meter of gas processed. More generally, this pressure loss may range between 10 and 200 mm. of water; in many instances the liquid consumption will be only one to two liters per cubic meter of throughput.

In specific cases, e.g. where a particularly thorough intermingling of gas and wash water is desired, mixing speeds above those specified above (extending beyond the range of incompressible gas flow and even well into the supersonic range) may be utilized. Under such circumstances, as also in those instances in which the maintenance of a specific output pressure is desirable, the pressure difference between the upper and lower compartments of the tower may be used as the control variable rather than the flow velocity through the mixing nozzles. Thus, in a wash tower of usual dimensions this difference may be conveniently established at approximately 700 to 1000 mm. water (i.e. 70 to 100 millibars). With this type of control the the channel width of all nozzles should be adjusted simultaneously, whereas with velocity control the throttle adjustment is preferably individual.

The above and other objects, features and advantages of my present invention will become more readily apparent from the following detailed description, reference being made to the accompanying drawing in which.

Figure 1:
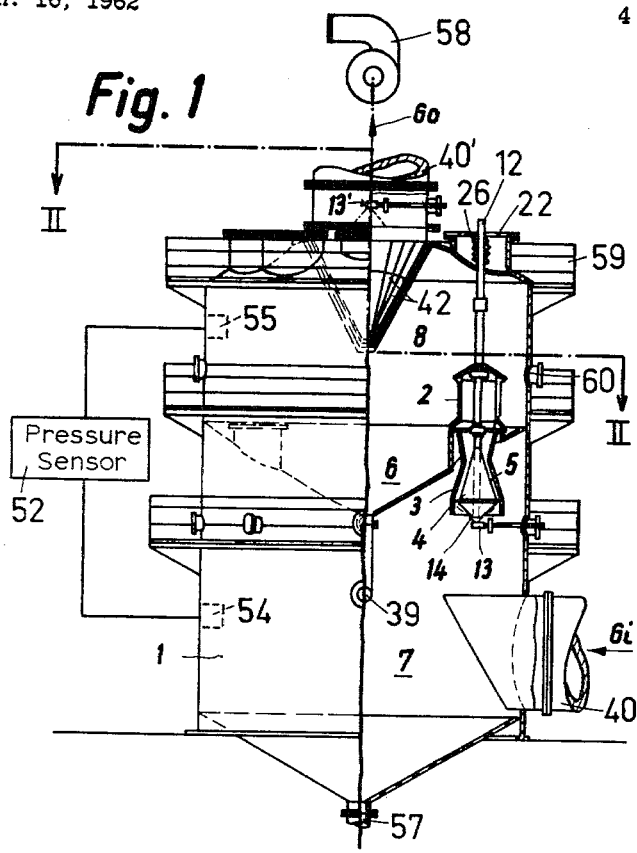
FIG. 1 is a partially cut-away side-elevational view of a wash tower embodying the invention.
Figure 2:
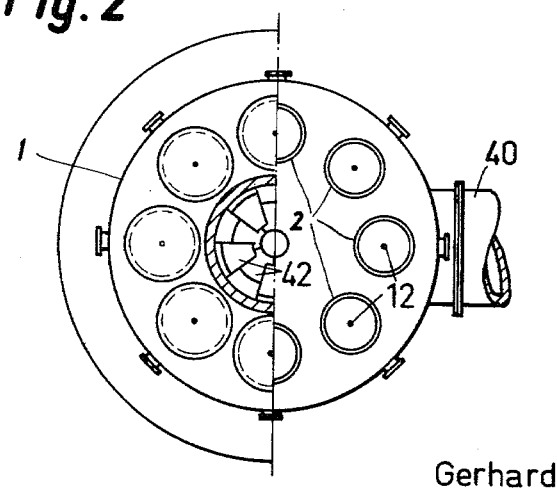
FIG. 2 is a top plan view, partly in section, of the tower of FIG. 1 taken on the line II—II thereof.
Figure 3:
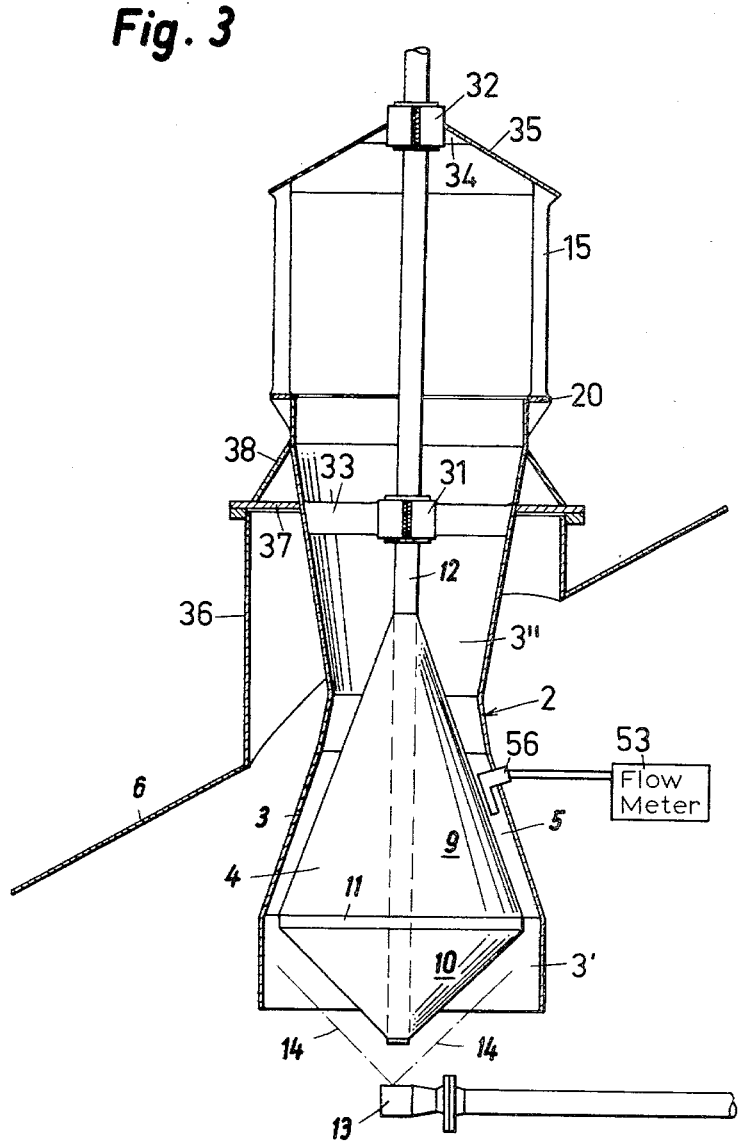
FIG. 3 is an enlarged view in vertical axial section of a mixing nozzle forming part of the tower of FIGS. 1 and 2.
Figure 4:
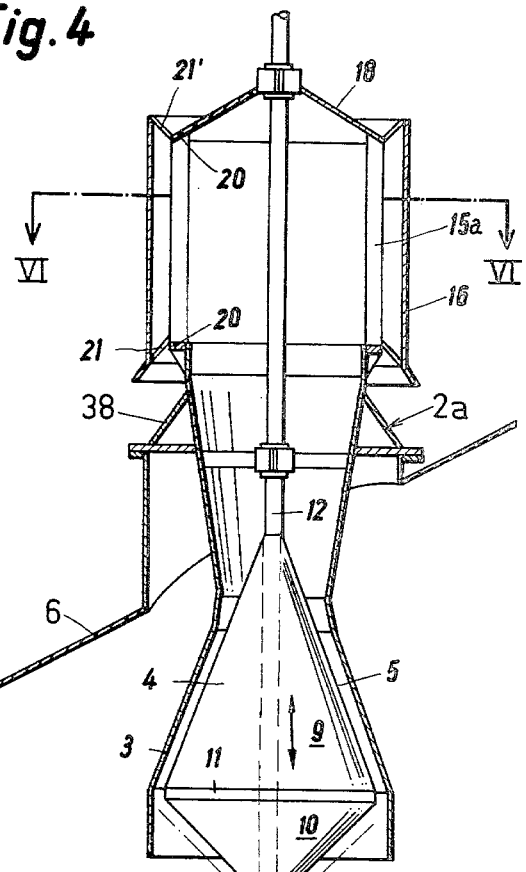
FIG. 4 is a view similar to FIG. 3, illustrating a modified mixing nozzle.

The wash tower 1 shown in FIGS. 1 and 2 has a cylindrical housing whose interior is divided by a generally horizontal, funnel-shaped partition 6 into a lower compartment 7 and an upper compartment 8. A circular array of mixing nozzles 2 are disposed on the slope of the funnel cone and form constricted passages between the two compartments. Each nozzle 2 includes a tubular outer shall 3 narrowing frustoconically from its extremities toward an intermediate zone of minimum diameter, in the manner of a Venturi tube, and a generally drop-shaped or streamlined throttling insert 4 defining an annular channel 5 of substantially constant but adjustable width with the lower frustoconical shell portion surrounding it. As best seen in FIGS. 3 and 4, the insert 4 consists essentially of an upper and a lower truncated cone 9, 10 separated by a narrow cylindrical zone 11, the insert thus being essentially a figure of rotation of a substantially deltoidal polygon about its longer axis; the apex angle of the upper frustocone 9 is considerably smaller than that of the lower frustocone 10. The last-mentioned apex angle substantially corresponds to that of a conical water spray 14 emitted by a jet 13 below a stem 12 on which the insert 4 is suspended for stepless vertical adjustment relative to shell 3. The insert thus acts as an adjustable throttle member for a gas stream passing upwardly through annular channel 5.

Stem 12 extends slidably through a pair of collars 31, 32, the former being connected by spider arms 33 with the surrounding shell 3 whereas the latter is secured by similar arms 34 to a hood 35 which closes the upper end of the nozzle. Slats 15 support the hood 35 on an annular flange 20 of shell 3 so as to form a virtually unobstructed lateral outlet for gases rising within nozzle 2. Shell 3 is supported on partition 6 by a cylindrical shield 36 with a cover plate 37 topped by a frusto-conical roof 38 which, along with the upper surface of the partition, forms a shelf for the runoff of condensing moisture toward a centrally located drain 39. The incomping and outgoing gas streams, respectively designated Gi and Go, are conducted through an entrance pipe 40 into the lower compartment 7 and through a flue 41 out of the upper compartment 8. A supplementtal spray head 13' in flue 41 directs additional wash water downwardly into the ascending gas stream. Interleaved baffle plates 42 constitute further impact and deflecting surfaces while also reducing turbulence at the approach to flue 41.

Forced-circulation means, such as a blower 58, may be used in either or both ducts 40, 41 to accelerate the passage of gas through the tower. Observation platforms 59 and access ports 60 facilitate maintenance and repair.

Figure 7:
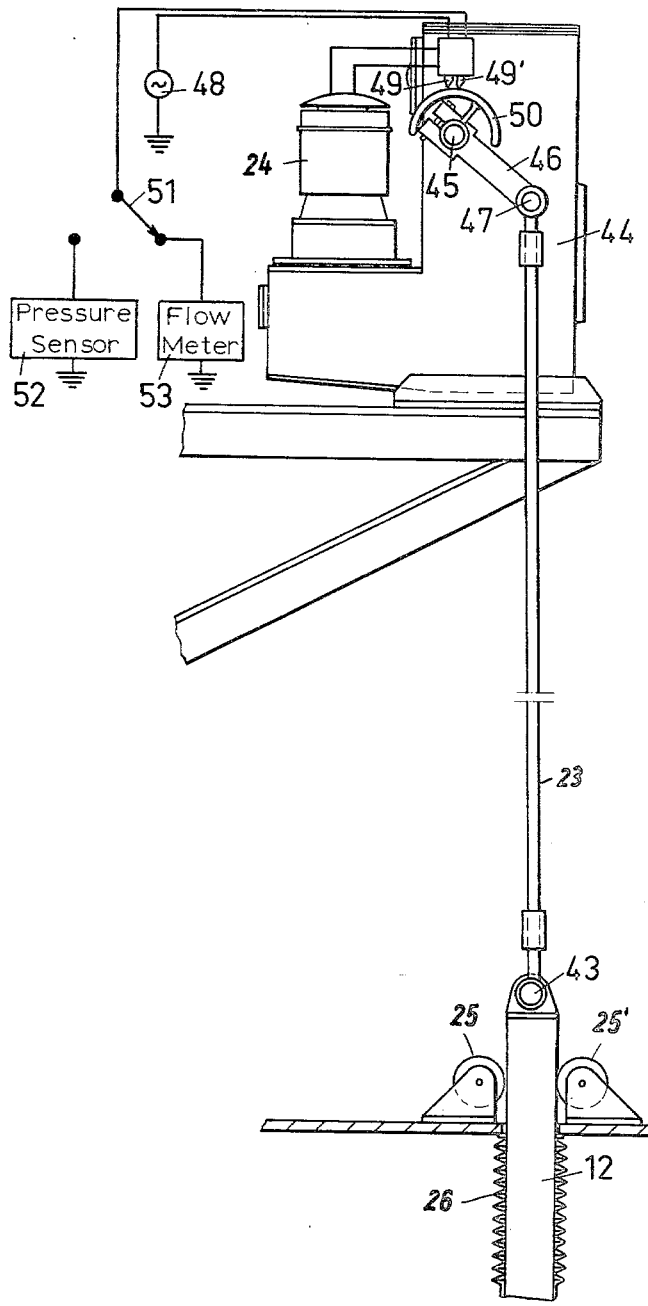
FIG. 7 illustrates, somewhat diagrammatically, details of an adjusting mechanism for the mixing tubes shown in preceding figures.

The stem 12 of each nozzle 2 traverses a respective hatch cover 22 to which it is joined by a flexible and gas-tight seal in the form of a bellows 26. As illustrated in FIG. 7, stem 12 is slidably guided between rollers 25, 25' and is articulated at 43 to a rod 23 which is displaceable by a servomotor 24 through a transmission housing 44 whose output shaft 45 carries a crank arm 46 linked to the rod 23 at 47. The energizing circuit of motor 24 includes, in addition to a power source 48, a pair of limit switches 49, 49' which co-operate with a segment 50 on shaft 45 to prevent any swinging of arm 46 beyond its effective range; it further includes a manually settable switch 51 leading to either of two control devices shown as a pressure sensor 52 and a flow meter 53. As illustrated in FIGS. 1 and 3, pressure sensor 52 may be controlled by two manometric devices 54, 55 to determine the pressure differential between compartments 7, 8 whereas the flow meter 53 may be controlled by a Pitot tube 56 in channel 5. It is to be understood that pressure sensor 52 and its associated detectors 54, 55 may be common to the servomotors 24 of all nozzles 2 while the flow meter 53 with its detector 56 should be individual to each motor and nozzle.

In operation, the spray water from jet 13 ascends through a cylindrical skirt 3' of shell 3 into the flow-accelerating channel 5 where it is entrained by the rising gases. In the upper tube portion 3", where another expansion of the gas begins, the droplets of moisture coalesce and return partly to the lower compartment 7 for discharge at a drain 57, the remainder of the condensate running off the shelves 38 and 6 into the drain 39. Hood 35 acts as a baffle cap which directs the gas flow radially outwardly between slats 15 for separation of the dust and liquid particles from the gaseous fluid. The effective width of channel 5 is varied by its servomotor 24, either continuously or intermittently, to maintain the desired operating parameter (i.e. flow velocity or pressure difference) substantially constant with the aforestated limits.

Figure 6:
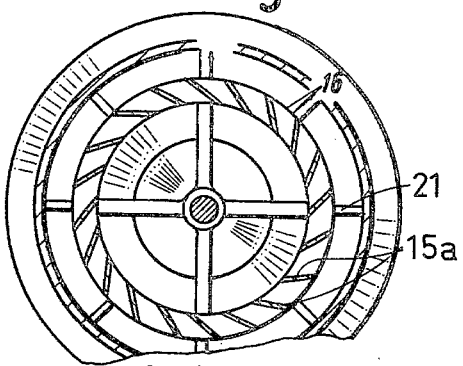
FIG. 6 is a cross-sectional view taken on the line VI—VI of FIG. 4.

In FIG. 4 I have shown a modified nozzle 2a in wnich parts identical with those of nozzle 2 have been given the same reference numerals. The radially oriented slats 15 on flange 20 have been replaced by guide means 15a which, as best seen in FIG. 6, are inclined relatively to the axial planes of the nozzle so as to impart a spin to the emerging gas stream. This stream is intercepted by a cylindrical sleeve 16 which coaxially surrounds the shell 3 and is fastened to it and to the hood 18 by struts 21 and 21', respectively. The angular position of the vanes 15a is so selected as to create optimal vortex conditions with the particular flow rate it is desired to maintain.

Figure 5:
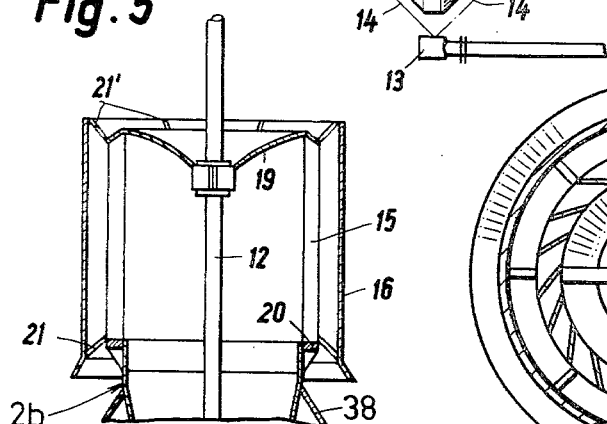
FIG. 5 shows a modification of a portion of the nozzle of FIG. 4.

The nozzle 2b of FIG. 5 differs from nozzle 2a only by the substitution of a curved deflecting hood 19 for the baffle cap 18 of the preceding figures. This softens the impact between the gas flow and the nozzle top, thereby reducing the pressure loss in the system. Coalescent liquid particles collected by sleeve 16 flow downwardly past the struts 21 in the case of either nozzle 2a, 2b.

My invention is, of course, not limited to the specific embodiments described and illustrated but may be realized in various modifications and adaptations without departing from the spirit and scope of the appended claims.

I claim:

1. An installation for cleaning gases, comprising a tower, a generally horizontal partition means subdividing the interior of said tower into a lower and an upper compartment, nozzle means traversing said partition and forming a constricted passage between said compartments, said nozzle means including at least one shell with an upwardly converging lower portion and an upwardly diverging upper portion and further including a generally drop-shaped movable throttling insert with an inwardly and upwardly tapering top forming an annular channel of substantially uniform width with said upwardly converging lower portion, deflecting means above said annular channel and said upwardly diverging portion within said upper compartment for directing ascending gases from said lower compartment laterally outward from said nozzle means above said partition means, manometrically controlled means in said tower connected to said insert and responsive to the pressure differential between said upper and lower compartments for adjusting the position of said throttling insert to maintain a substantially constant pressure differential across said passage, and spray means at the bottom of said nozzle means for injecting a washing liquid into said channel along with said gases.

2. An installation according to claim 1 wherein said top is formed as a frusto conical part of relatively small apex angle coaxially extending within said upwardly converging lower portion, said insert being further formed with a frusto conical downwardly tapering bottom of relatively large apex angle depending from said top below said upwardly converging lower portion.

3. An installation according to claim 2 wherein said shell has a substantially cylindrical skirt depending from said upwardly converging lower porton and at least partly surrounding with clearance said lower frusto conical bottom, said spray means being positioned beneath said bottom to direct a conical spray into the space between said lower frusto conical bottom and said skirt.

4. An installation according to claim 3 wherein said conical spray has an apex angle substantially equalling said relatively large apex angle.

5. An installation for cleaning gases, comprising a generally cylindrical tower, a generally horizontal partition of substantially conical configuration with a downwardly pointing apex in said tower, said partition subdividing the interior of said tower into a lower and an upper compartment, an inlet for said gases extending substantially radially into said lower compartment below said partition, a drain opening at said upper compartment at said apex, a set of at least three nozzles traversing said partition and forming a set of constricted passages between said compartments, said nozzles being disposed near the periphery of said partition in a circular array centered on the cone axis, each of said nozzles including a shell with an upwardly converging lower porton and an upwardly diverging upper portion and further including a generally drop-shaped throttling insert with an upwardly tapering top forming an annular channel of substantially uniform width with said upwardly converging lower portion, deflecting means above said channels and said upwardly diverging upper portions within said upper compartment for directing ascending gases from said lower compartment laterally outwardly from said nozzles above said generally horizontal partition, and an individual spray means at the bottom of each of said nozzles for injecting a washing liquid into said annnular channels along with said gases.

References Cited by the Examiner
UNITED STATES PATENTS

| | | | |
|---|---|---|---|
| 2,234,735 | 3/41 | Lambert et al. | 261—118 X |
| 2,621,754 | 12/52 | Doyle. | |
| 2,703,629 | 3/55 | Moerke | 55—213 |
| 2,709,496 | 5/55 | Baker | 55—163 |
| 2,797,904 | 7/57 | Voorheis | 261—118 |
| 2,874,799 | 2/59 | Van Der Kolk | 139—597 |
| 2,964,304 | 12/60 | Rice | 137—487 X |
| 3,055,389 | 9/62 | Brunner | 137—487 |
| 3,140,163 | 7/64 | Hausberg | 261—117 |

FOREIGN PATENTS

| | | |
|---|---|---|
| 534,680 | 9/31 | Germany. |
| 671,395 | 2/39 | Germany. |
| 840,064 | 7/60 | Great Britain. |

REUBEN FRIEDMAN, *Primary Examiner.*

HARRY B. THORNTON, *Examiner.*